(12) United States Patent
Molnö et al.

(10) Patent No.: US 7,054,285 B2
(45) Date of Patent: May 30, 2006

(54) METHOD AND APPARATUS FOR ASSOCIATED SIGNALING IN A WIRELESS COMMUNICATIONS NETWORK

(75) Inventors: Johan Molnö, Bromma (SE); Susanne Ahlstrand, Sollentuna (SE); Christofer Lindheimer, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 711 days.

(21) Appl. No.: 09/752,859

(22) Filed: Dec. 28, 2000

(65) Prior Publication Data

US 2001/0030949 A1    Oct. 18, 2001

Related U.S. Application Data

(60) Provisional application No. 60/184,065, filed on Feb. 22, 2000.

(51) Int. Cl.
*H04Q 7/00* (2006.01)
(52) U.S. Cl. ...................... 370/329; 370/345
(58) Field of Classification Search .............. 370/329, 370/330, 331, 335, 336, 337, 340, 350, 348, 370/430, 321, 347; 455/445, 453, 450, 449, 455/524
See application file for complete search history.

(56) References Cited

U.S. PATENT DOCUMENTS

| | | | |
|---|---|---|---|
| 5,396,539 A | 3/1995 | Slekys et al. | 379/59 |
| 5,528,664 A | 6/1996 | Slekys et al. | 379/58 |
| 5,612,991 A | 3/1997 | Nair et al. | 379/59 |
| 5,844,894 A * | 12/1998 | Dent | 370/330 |
| 5,881,061 A | 3/1999 | Iizuka et al. | 370/337 |
| 6,137,787 A * | 10/2000 | Chawla et al. | 370/337 |
| 6,229,796 B1 * | 5/2001 | Dent | 370/335 |
| 6,333,916 B1 * | 12/2001 | Hamada et al. | 370/225 |
| 6,497,599 B1 * | 12/2002 | Johnson et al. | 455/447 |
| 6,516,350 B1 * | 2/2003 | Lumelsky et al. | 709/226 |
| 6,584,084 B1 * | 6/2003 | Barany et al. | 370/329 |
| 6,597,681 B1 * | 7/2003 | Conner | 370/347 |
| 6,647,000 B1 * | 11/2003 | Persson et al. | 370/330 |
| 6,904,031 B1 * | 6/2005 | Ramaswamy et al. | 370/337 |

FOREIGN PATENT DOCUMENTS

WO   PCT/SE/ 01/00286   7/2001

* cited by examiner

*Primary Examiner*—Hassan Kizou
*Assistant Examiner*—Ricardo M. Pizarro (57) ABSTRACT

A packet data communication network includes a plurality of base stations for communicating with mobile stations of a user over packet data traffic channels. Radio transmission control nodes control the operation of the plurality of base stations and a scheduler associated with each of the base stations is configured to allocate a first logical control channel associated with a first user application on a first part of an available radio channel resource, and to allocate a second logical control channel associated with at least a second user application on a second part of the available radio channel resource.

16 Claims, 7 Drawing Sheets

METHOD AND APPARATUS FOR ASSOCIATED SIGNALING IN A WIRELESS COMMUNICATIONS NETWORK

CROSS-REFERENCES TO RELATED APPLICATIONS

This Application for Patent claims the benefit of priority from, and hereby incorporates by reference the entire disclosure of, co-pending U.S. Provisional Application for Patent Ser. No. 60/184,065 filed Feb. 22, 2000.

BACKGROUND OF THE INVENTION

The present invention generally relates to wireless communication. More specifically, the invention relates to a method and apparatus for scheduling of associated signaling information.

Recently, there has been a trend in the telecommunication community to focus more and more on wireless packet data communication rather than wireless circuit switched communication. With the tremendous increase of Internet users, and usage of Internet protocols, it is believed that the packet switched communication will soon become larger than the circuit switched communication that today dominates, e.g., the cellular communication. Cellular communication system manufacturers and operators are therefore looking for solutions to integrate their circuit switched services with wireless packet switched services that can provide reliable and more spectrum efficient connections for packet switched users, e.g., Internet users. This trend has made different types of packet switched communication system evolutions flourish. One of the more well known packet switched cellular systems in the telecommunications community, is the extension of the present GSM cellular communication system, called GPRS (General Packet Radio Service).

GPRS is a packet switched system that uses the same physical carrier structure as the present GSM cellular communication system and is designed to coexist and provide the same coverage as GSM. GPRS radio interface is thus based on a TDMA (Time Division Multiple Access) structured system with 200 kHz carriers divided into eight timeslots with GMSK (Gaussian Minimum Shift Keying) modulation. The multiplexing is such that multiple users can be allocated on the same timeslot, and resources are utilized only when data needs to be transmitted. A single user can also be allocated on multiple timeslots to increase the throughput of data over the air interface.

The GPRS specification includes a number of different coding schemes to be used dependent on the quality of the radio carrier. With GPRS, data rates well over 100 kbps will be possible.

There is also ongoing a development and standardization of a new air interface mode in GSM, which will affect both packet and circuit switched modes. This new air interface mode is called EDGE, Enhanced Data rates for Global Evolution. The main features of EDGE are new modulation and coding schemes for both packet switched and circuit switched data communication. In addition to the Gaussian Minimum Shift Keying (GMSK) modulation, which is used today for both GPRS and GSM circuit switched mode, an 8 symbol Phase Shift Keying (8PSK) modulation is introduced. This modulation can provide users with higher data rates than GMSK in good radio environments.

The packet data mode with EDGE modulation is called EGPRS (Enhanced GPRS) and the circuit switched data mode is called ECSD, (Enhanced Circuit Switched Data). With EGPRS and 8 PSK modulation, data rates over 384 kbps will be possible.

Recent developments for another TDMA based cellular system, the cellular communication system compliant to the ANSI/136 standard, referred to below as TDMA/136, has been focused on a packet data system to be integrated with the TDMA/136 circuit switched mode.

This packet data system will also be based on the new EDGE technology as defined for the GPRS extension. It will then allow TDMA/136 operators with a packet data mode to provide data rates up to 384 kbps on 200 kHz carriers with GMSK and 8PSK modulation as defined for EGPRS.

While the evolution of cellular packet data communication previously has been focused on developing a system that efficiently utilizes resources to transfer data which is non-delay sensitive (often referred to as best-effort data), the focus is now shifting towards the transmission of data for delay sensitive applications and higher quality of service requirements. The main application is voice communication.

While it is today rather straightforward to establish and maintain a circuit switched connection for delay sensitive voice communication, a packet switched connection is traditionally designed for non-delay sensitive applications, such as downloading of files, and not for voice communication. There are several things in a packet data system designed for "best-effort" data that require modifications to make it suitable for delay sensitive applications such as voice communication.

One important area still to be solved is the transmission of control signals in packet data transfer mode, i.e., when occupied in a data transfer on an allocated transmission resource.

In present EGPRS/GPRS networks, signaling of control signals while occupied in data transfer is typically handled by transmissions on a logical control channel called Packet Associated Control Channel (PACCH) that share transmission resources with the associated data stream. While this scheme works well for non-delay sensitive applications, it is not an advantageous method for delay sensitive applications. The signaling of control information requires allocation of transmission resources and if these are shared with the voice communication, there will be interrupts when control signaling is required. At present, there is no support for control signaling during packet data transfer mode in an GPRS/EGPRS system without interrupting the ongoing data flow. In circuit switched GSM, additional transmission resources are defined for a Slow Associated Control Channel, (SACCH), such that transmission of control information associated with a traffic channel (TCH) does not introduce interrupts in the ongoing traffic communication. The SACCH can be viewed as a "side stream" flow of information, both from the base station to the mobile station and in the opposite direction.

It would be advantageous also to introduce such an SACCH in a packet switched system, in order to transmit control information in a "side stream" in a bandwidth efficient way, thereby avoiding unwanted interrupts in, e.g., a voice communication over packet data.

SUMMARY OF THE INVENTION

In one aspect of the present invention, user dedicated control channels are allocated on an available radio channel resource for control signalling in packet data transfer mode in a packet communication system to support more or less delay sensitive applications. More specifically, resources are allocated in the uplink direction from a mobile station to a base station such that a mobile station may send control information, e.g., measurement reports, to the base station without interrupting an ongoing data communication session. Additionally, resources are allocated in the downlink direction from a base station to a mobile station such that a base station may send control information, e.g., system specific information, to the mobile station without interrupting the ongoing data communication session. The data communication session may be a voice communication session.

In another aspect of the present invention, a Packet Slow Associated Control Channel (PSACCH) associated with a first delay sensitive user appplication is allocated to share available radio channel resources with a Packet Timing Advance Control Channel (PTCCH) associated with at least a second non-delay sensitive user appplication. The PTCCH is used for the transmission of timing advance information in both uplink and downlink directions.

In another aspect of the present invention, a scheduler is arranged in each of a plurality of base stations that operates to allocate logical control channels on the same available radio channel resource for the transmission of a PTCCH and a PSACCH.

The present invention enables a delay sensitive application, being assigned for traffic communication on at least one timeslot in a time division multiplex access (TDMA) based communication system, to share available radio channel resources with other non-delay sensitive applications. The delay sensitive application is supported by control signaling between a base station and a mobile station without interruption of the ongoing data flow. Instead, the control signaling is carried in a side stream on radio channel resources that are separate from those used for the transmission of user data, e.g., voice data, for the delay sensitive application.

BRIEF DESCRIPTION OF THE DRAWINGS

Features, objects and advantages of the present invention will become apparent to those skilled in the art by reading the following detailed description where references will be made to the appended figures in which.

DETAILED DESCRIPTION

The present invention will now be described with reference to a GPRS/EGPRS based cellular packet data communication system and extensions thereof as briefly described in the background. Comparisons will be made with GSM, representing a circuit switched communication system.

Figure 1:
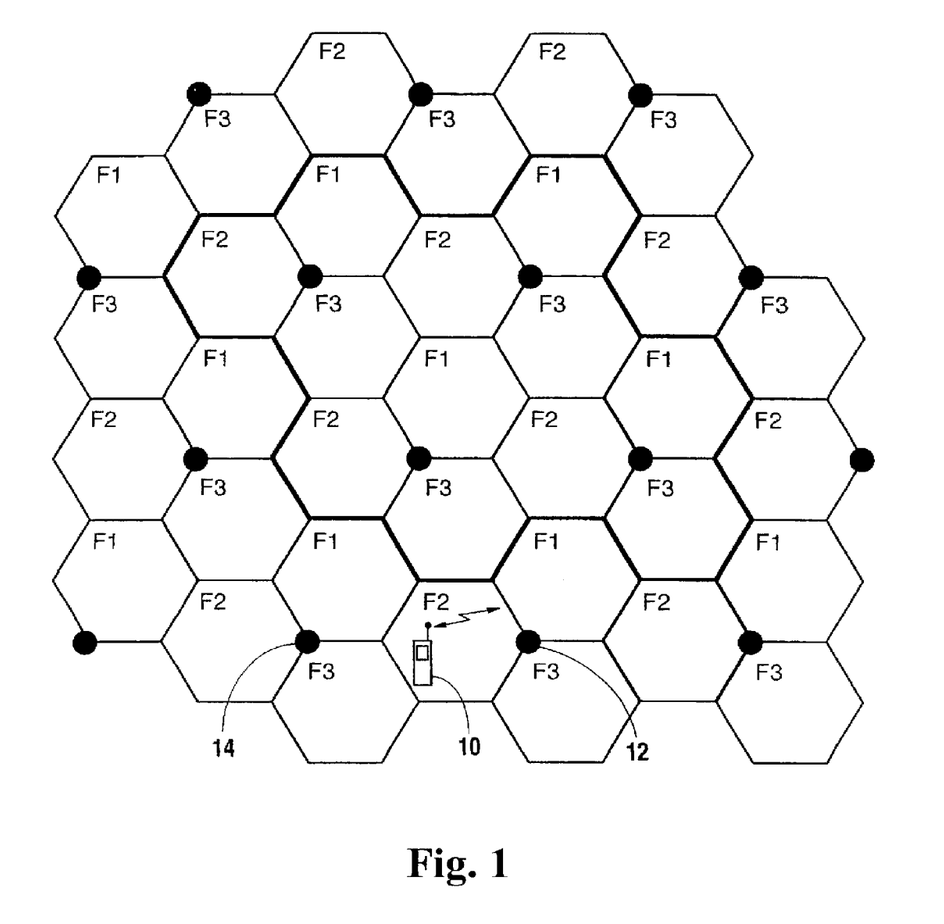
FIG. 1 illustrates a cellular pattern of an exemplary cellular communication system.

FIG. 1 illustrates a cellular pattern according to a GSM or GPRS/EGPRS communication system. Frequencies are typically planned to be used in one area, or cell, and then re-used in another area, or cell, at a certain distance from the first area. The planning of frequencies aim at introducing a sufficient re-use distance such that communication on, e.g., F1 in one area does not interfere with communication on F1 in another area. This is illustrated in FIG. 1, where a theoretical re-use pattern of ⅓ is illustrated. Frequencies F1, F2 and F3 are evenly distributed throughout a coverage area, each frequency serving a sub-area, or cell. The ⅓ reuse indicates that there are 3 different frequencies which are repeated throughout the coverage area. The frequencies may be planned in any re-use pattern, dependent on the available spectrum. The re-use pattern may also differ within a system, dependent on topology and geographical conditions.

In another deployment of a GSM communication system, timeslots are also reused in order to achieve a two-dimensional re-use of both frequency and time. These principles are described in U.S. patent application Ser. No. 09/263,950, "High Speed Data Communication System and Method" to Mazur et al., hereby incorporated by reference. In FIG. 1 is illustrated a mobile station (MS) 10, communicating in one cell with a base station (BS) 12. The MS may continuously measure signals from surrounding base stations, e.g., BS, 14, to find a candidate BS for handover when the serving base station becomes unable to maintain the communication. This may happen, e.g., when the MS moves away from the serving BS (12), approaching another BS (14). Measurements may be reported to the network via the serving BS 12 and a handover decision may be taken in the network.

Figure 2:
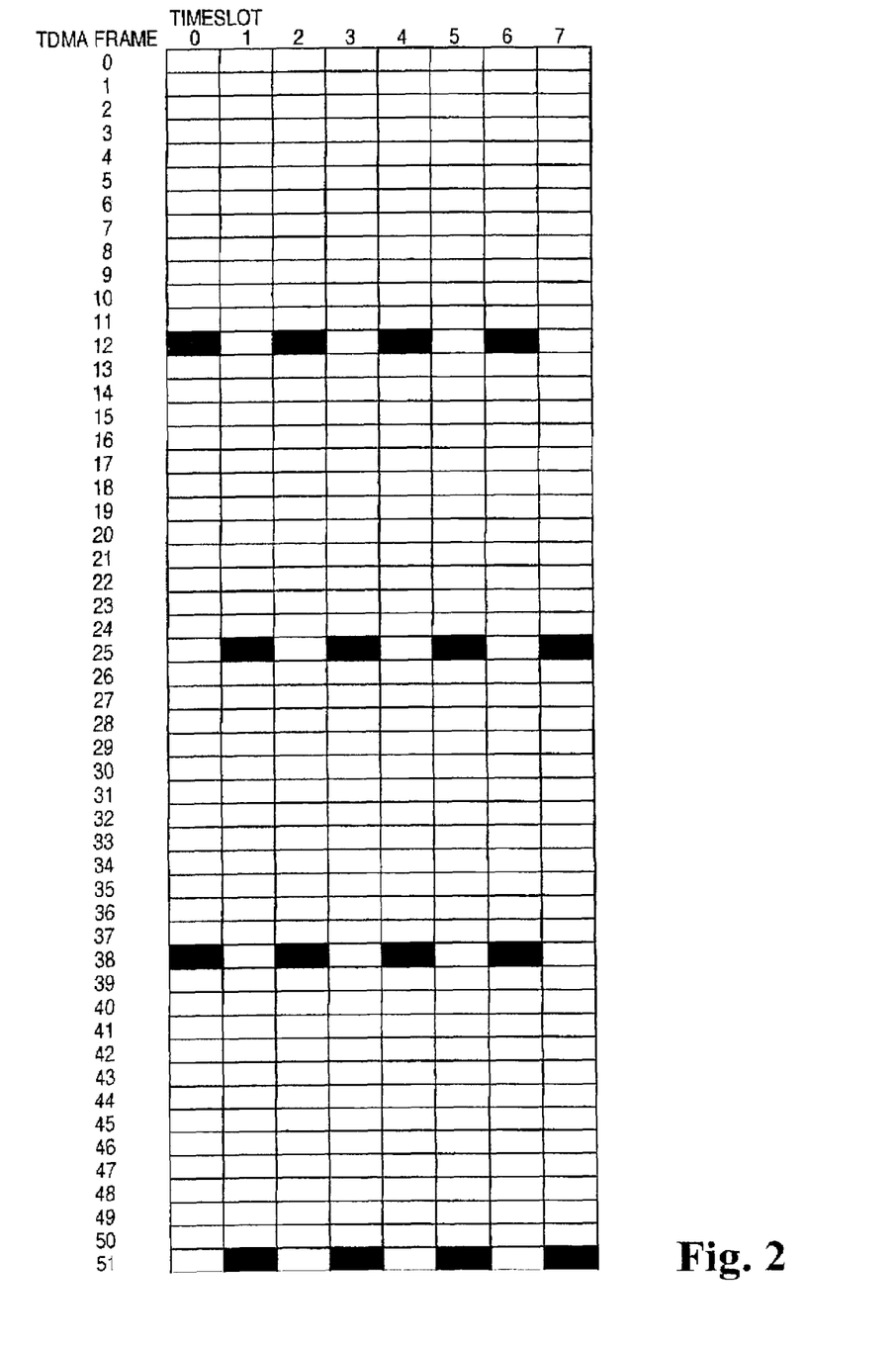
FIG. 2 illustrates a 52 multiframe repetition pattern for GSM circuit switched traffic channels.

FIG. 2 illustrates a repetition pattern for transmission over a GSM circuit switched traffic channel onto one frequency. In FIG. 2 is also illustrated the division of one frequency into 8 timeslots (TS0–TS7). The timeslots are transmitted in sequence and are repeated on a frame-by-frame basis such that one frame consists of 8 consecutive timeslots. The up- and downlink timeslots are, however, not coinciding (not shown). This is to ease the processing burden on, e.g., mobile stations such that they do not have to transmit and receive at the same time. There is an offset of three timeslots between, e.g., TS0 in the downlink and TS0 in the uplink.

A logical traffic channel, e.g., a voice communication channel (TCH), may be allocated to one of the timeslots for transmitting speech bursts on one timeslot per frame. There are several possible frame repetition patterns in GSM. In FIG. 2, a 52 repetition frame pattern is illustrated. There are four frames altogether in the GSM 52-multiframe repetition pattern that are not used for TCH, e.g., a voice communication flow. These are marked in FIG. 2 as frames 12, 25, 38 and 51. The timeslots in these frames are either idle (not used for transmission) or used for allocating a logical control signaling channel called Slow Associated Control Channel (SACCH). The SACCH may be used in the uplink direction to transmit measurement reports and it may be used in the downlink direction to transmit cell specific information to an MS in dedicated mode, i.e., occupied in a circuit switched communication. Since these four frames are never used for transmission of user data, transmission of SACCH messages does not interrupt or introduce delays in, e.g., the voice communication. All other frames, (except 12, 25, 38 and 51) are assigned to the user on one timeslot, in both uplink and downlink direction. Alternatively, an MS may be assigned to use multiple timeslots in the uplink or the downlink (or both). Also in this case, the frames 12, 25, 38, and 51 are reserved for control signaling and not used for traffic.

In FIG. 2, the SACCH is allocated on even timeslots in frames 12 and 38 and on odd timeslots in frames 25 and 51. However, these frames are not sufficient to transfer a complete SACCH message which requires one timeslot in four frames. Thus, before an SACCH message can be decoded, transmission in a subsequent 52-multiframe is also required. For example, for TS0, a 52-multiframe contains two SACCH timeslots in frames 12 and 38 to be combined with the two SACCH timeslots of frames 12 and 38 in the following 52-multiframe. The repetition pattern of the SACCH is thus two 52-multiframes, or 104 frames.

Figure 3:
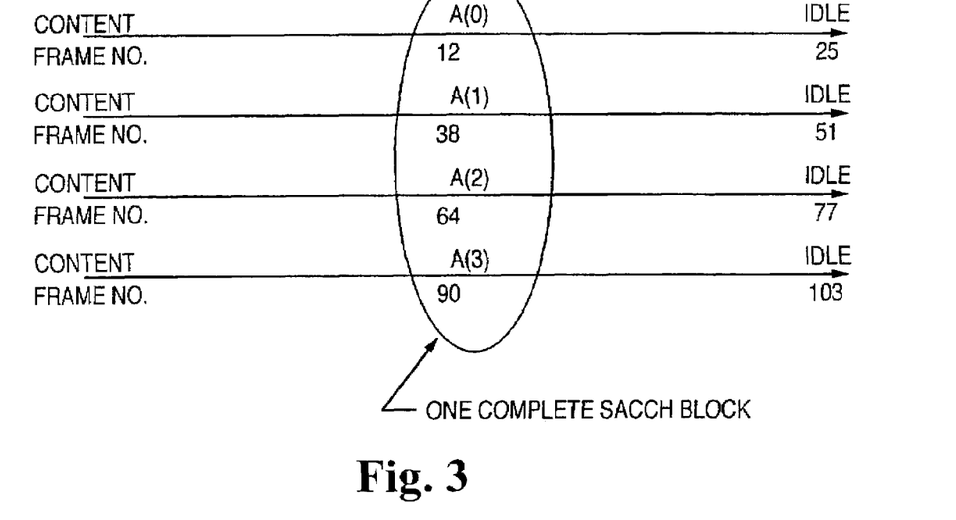
FIG. 3 illustrates a SACCH repetition pattern according to GSM circuit switched communication.

FIG. 3 illustrates the repetition pattern for SACCH in a 104-multiframe pattern for TS0 corresponding to an SACCH period of 480 ms. The figure illustrates a number of sequential frames and the content thereof, with respect to the frames not used for traffic communication. It illustrates that a complete SACCH block is distributed over frames 12, 38, 64 and 90 in a 104-multiframe pattern and that frames 25, 51, 77 and 103 (not used for traffic) are idle. It should be noted that corresponding frame numbers can be used for any timeslot, e.g., odd timeslots, but then with the frames 12, 38, 64 and 90 made idle.

The principles for allocation of a SACCH on these frames are explained in "GSM 05.02: Digital cellular telecommunications system (Phase 2+); Multiplexing and multiple access on the radio path, v.6.2.0", hereby incorporated by reference.

As mentioned above, the SACCH can be viewed as a side stream of control information that can be communicated with an MS being occupied in, e.g., a voice communication on a circuit switched radio channel in GSM. Control information is thus transferred without stealing resources from the traffic channel (TCH).

Moving now to the packet switched communication system GPRS, where introduction of a similar side stream of control information would also be beneficial, in particular when packet switched real-time services are introduced, like, e.g., voice communication.

Figure 4:
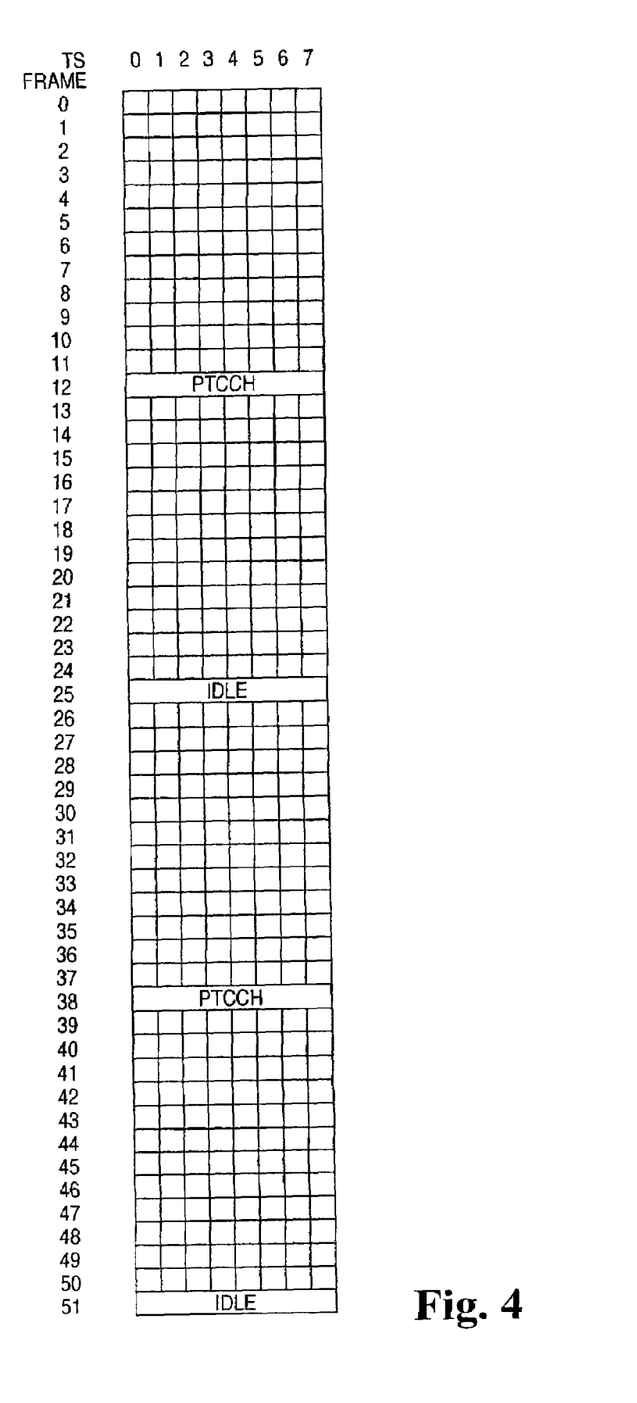
FIG. 4 illustrates a 52 multiframe repetition pattern for GPRS/EGPRS packet switched traffic channels.

FIG. 4 illustrates a 52-multiframe structure as used in GPRS/EGPRS communication systems. It is in many ways similar to the GSM communication system multiframe, except that there are no radio channel resources allocated for SACCH transmissions. There is in fact a Packet Associated Control Channel (PACCH) defined in GPRS, but this channel shares radio channel resources with the Packet Data Traffic Channels (PDTCH). Consequently, whenever control information is transmitted on the PACCH during a GPRS/EGPRS packet data session, the information flow of user traffic data is interrupted.

Figure 5:
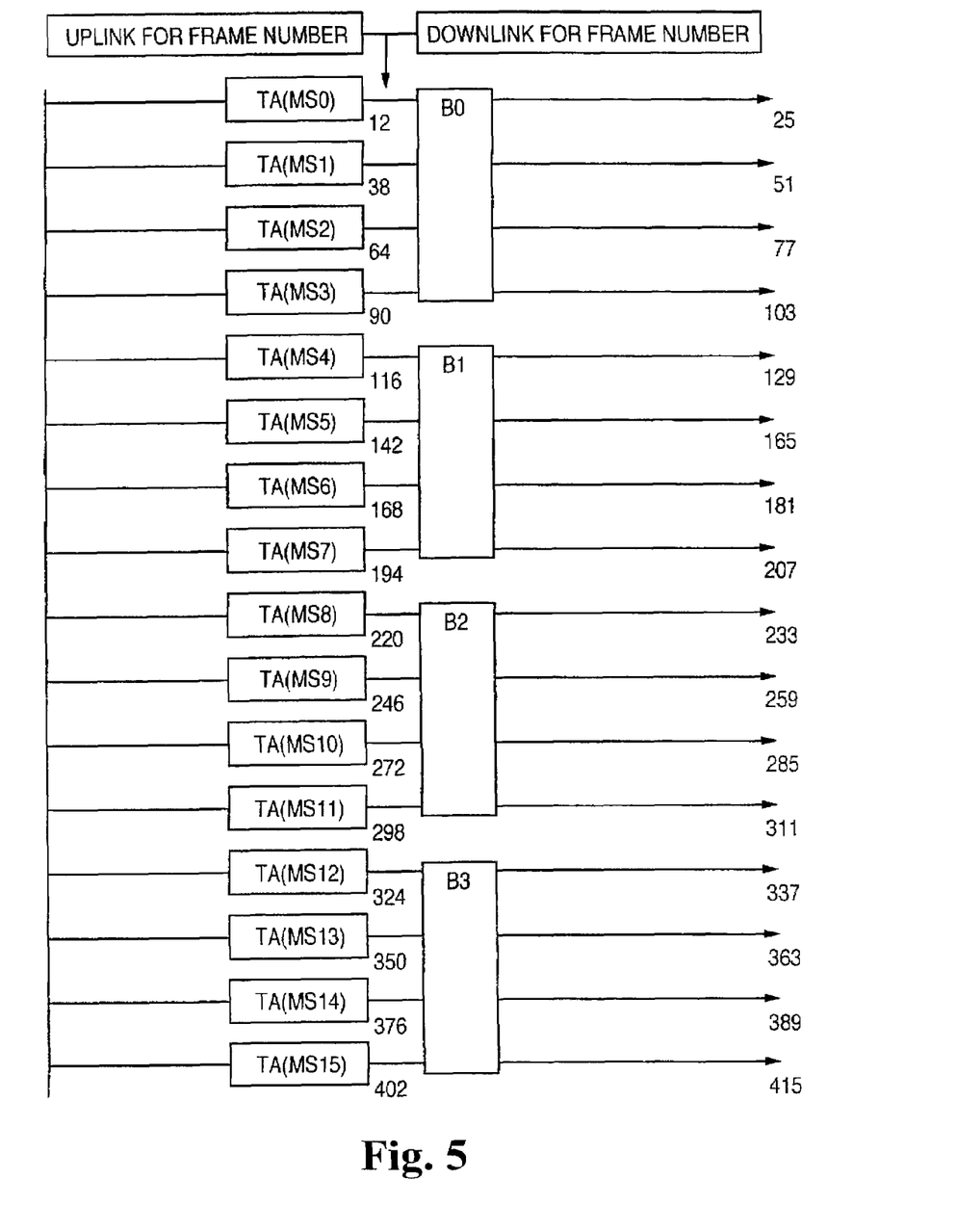
FIG. 5 illustrates a PTCCH repetition pattern according to GPRS/EGPRS packet switched communication.

A GPRS/EGPRS allocation scheme allows transmission of user data in all frames except frames 12, 25, 38 and 51. The user data is divided into radio blocks each comprising four frames. In between those user data radio blocks, frames 12 and 38 are used for a logical control channel called Packet Timing Advance Control Channel (PTCCH). Frames 25 and 51 are idle altogether. The PTCCH is sent in the downlink on all timeslots where resources are allocated for packet traffic. In the uplink, the PTCCH is used for sending shortened bursts from the MS to the BS, such that the BS may estimate a timing advance value, representing a propagation delay between the BS and the MS. The timing advance information needs to be updated periodically, since the MS may move around and the timing advance value is changed accordingly. The timing advance value is calculated in the BS and is then sent to the MS, such that the MS may adjust its transmissions accordingly when communicating with the base station. The downlink messages consists of four frames, forming a PTCCH/DL block (e.g., B0, B1, . . . ) including timing advance information for all MSs allocated on a timeslot. The repetition pattern of the PTCCH is indicated in FIG. 5. The PTCCH in the downlink is transmitted over four non-consecutive frames, i.e., in one frame at a time, in frame 12 and 38 in two consecutive 52-multiframes or, expressed differently, in frame 12, 38, 64 and 90 in a 104-multiframe. The PTCCH in the downlink (PTCCH/DL) includes timing advance values for, up to 16 MSs that may be allocated on the same timeslot. The uplink PTCCH (PTCCH/UL) will, in the case that 16 MSs are allocated on the same timeslot, require 16 occasions when PTCCH/UL may be transmitted. The uplink transmissions are allocated in the same frames as the DL, and it may thus take up to four 104-multiframes before all MSs have send their PTCCH/UL transmission. The repetition pattern of PTCCH is thus 416 frames, or eight 52-multiframes. The PTCCH/DL is transmitted four times during the 416-multiframe, and is continuously updated with new timing advance information for the allocated MSs.

The principles for PTCCH allocation is further explained in "GSM 03.64: Digital cellular telecommunications system (Phase 2+); General Packet Radio Service (GPRS); Overall description of GPRS radio Interface; Stage 2, v.6.2.0", hereby incorporated by reference.

In GPRS/EGPRS systems, it is desirable to provide radio communication for a plurality of different applications which are more or less delay sensitive. Delay sensitive applications, such as voice communication, are sometimes also refered to as real-time applications. With the introduction of real-time applications in GPRS/EGPRS, a packet switched associated control channel is needed that does not share radio channel resources with the user data stream of the real-time application, which uses its radio channel resources in continuous periods.

In one aspect of the present invention, a Packet Slow Associated Control Channel (PSACCH) is introduced in the GPRS/EGPRS communication system. Resources are allocated to this PSACCH such that an MS in packet transfer mode (e.g., in a voice communication session) may still utilize its PDTCH continuously for transmission of user data. Control signaling information may then be transmitted on the PSACCH allocated on a radio channel resource that is shared with the PTCCH, in both uplink and downlink direction. The PSACCH and the PTCCH are thus allocated on separate parts of an available radio channel resource. The PSACCH part and the PTCCH part of the available radio channel resource may be 50% each or may be selected based on the network configuration or the user applications involved.

In one embodiment of the present invention, the number of timing advance sessions (i.e., receiving timing advance indications in the base station and calculating, assigning and transmitting timing advance values to MSs) that is possible to accomplish with the PTCCH is decreased from 16 to 8. If a real-time user, e.g., a voice user, is assigned for transmissions on a timeslot, this user occupies the available traffic channel resources a significant amount of time. It is therefore not probable that several other users are assigned for traffic on the same timeslot at the same time. The decrease of possible timing advance sessions can then be utilized by allocating a PSACCH on the same radio channel resource. This may be done in a number of alternative ways.

Figure 6A:
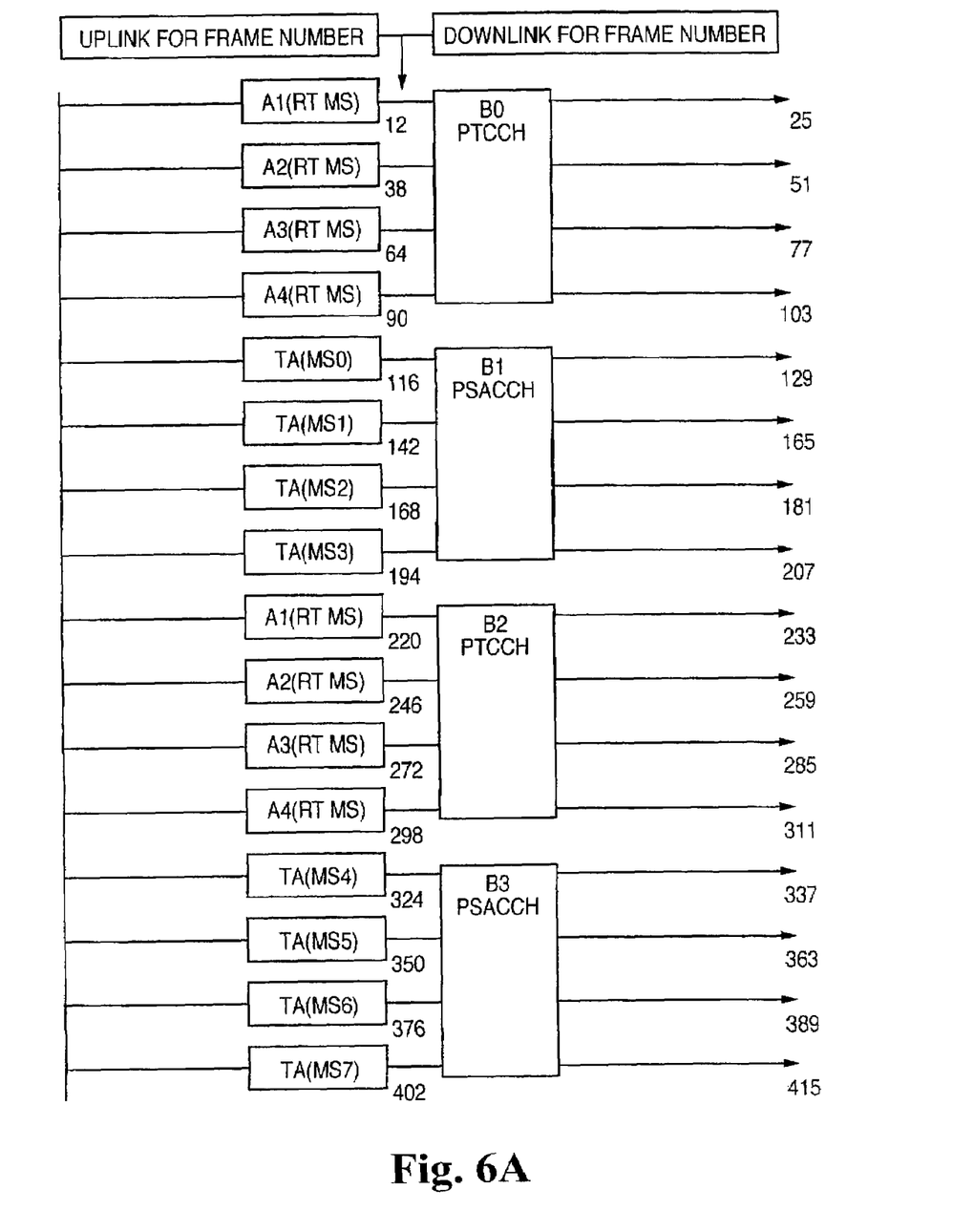
FIG. 6a illustrates a first 416 multiframe repetition pattern where a PTCCH and a Packet SACCH (PSACCH) share transmission resources according to the invention.

FIG. 6a illustrates one way of allocating PSACCH and PTCCH according to one embodiment of the present invention. In FIG. 6a, there is one real-time user and up to eight non real-time users allocated on the same timeslot.

As in FIG. 5, the repetition pattern for the PTCCH comprises still 416 frames, although there are only resources available for eight MSs to utilize the PTCCH/UL.

For the PTCCH/DL, only two blocks are transmitted during the 416-multiframe repetition pattern. A PSACCH is allocated for the real-time user on the remaining resources not used for the PTCCH/UL or PTCCH/DL. The repetition pattern for the PSACCH will not be equal to the SACCH in circuit switched communication that was described above. Instead, the PSACCH will need the double repetition pattern, i.e., a 208-multiframe. FIG. 6a illustrates that the first PSACCH in the uplink for the real-time user is allocated on frame numbers 12, 38, 64 and 90 and in the downlink on frame numbers 116, 142, 168 and 194. The following PSACCH message in the uplink is allocated on frame numbers 220, 246, 272 and 298 and the following downlink PSACCH is allocated on frame numbers 324, 350, 376 and 402. The PTCCH in the downlink is allocated on frame numbers 12, 38, 64 and 90 (for PTCCH B0) and 220, 246, 272 and 298 (for PTCCH B2). The PTCCH for the uplink is allocated on frame numbers 116, 142, 168, 194 (for PTCCH B1) 324, 350, 376 and 402 (for PTCCH B3). All the other indicated frame numbers remain idle, as in present GPRS/EGPRS. Idle frame numbers are thus 25, 51, 77 and so forth, i.e., each $26^{th}$ frame number for both uplink and downlink. It should be noted that since there are only eight uplink PTCCHs available in the repetition pattern, it is only possible to allocate eight best-effort (non real-time) MS users onto the timeslot. It is of course possible to extend the PTCCH cycle to have a repetition of 2×416 frames (=832 frames) such that 16 PTCCH/UL may still be allocated.

Figure 6B:
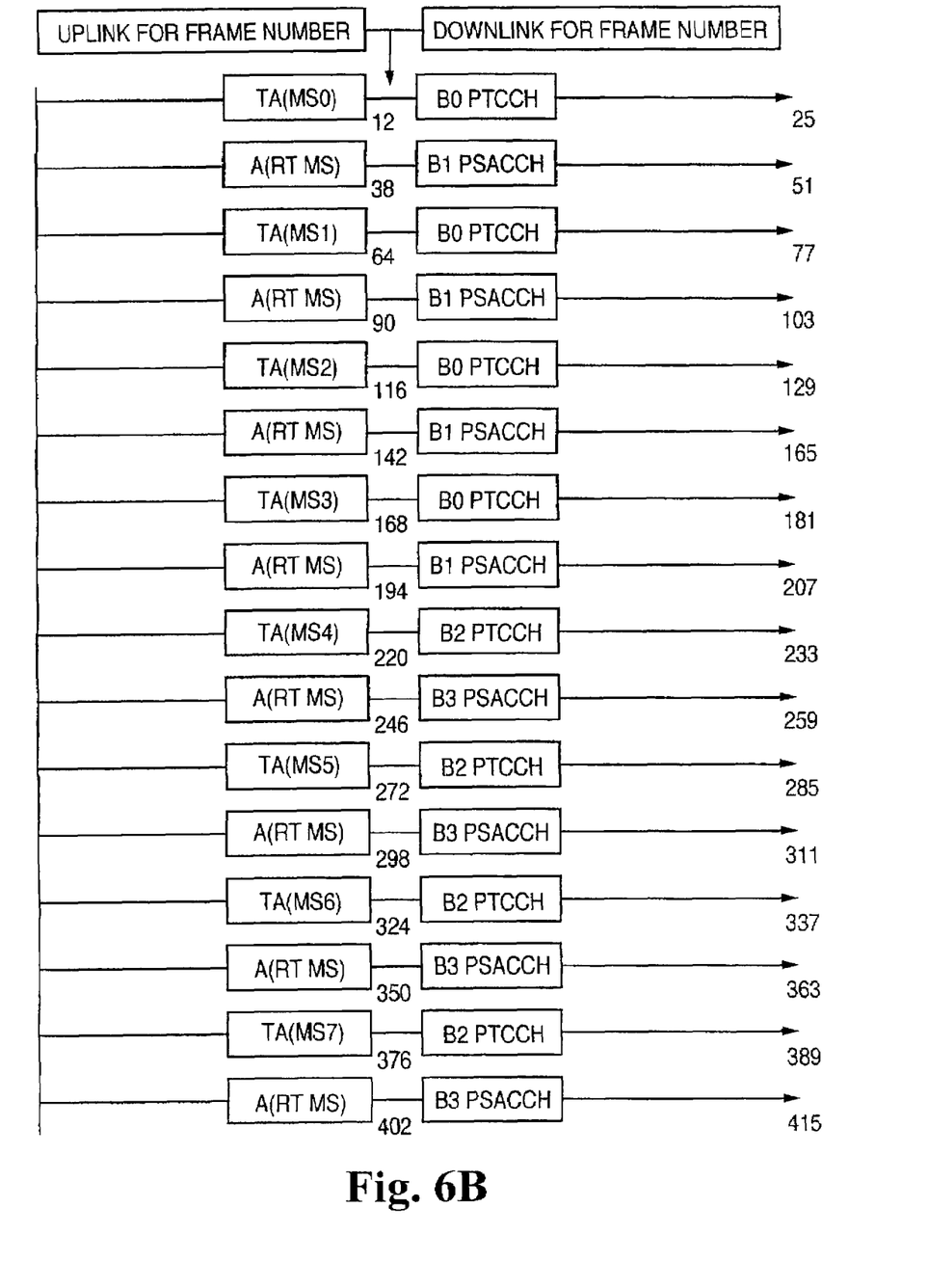
FIG. 6b illustrates a second 416 multiframe repetition pattern where a PTCCH and a PSACCH share transmission resources according to the invention.

There are also several other ways of distributing the usage of transmission resources to fit in a PTCCH and a PSACCH channel. FIG. 6b illustrates an alternative distribution pattern. In FIG. 6b, PTCCH and PSACCH are allocated in every second frame of the available radio channel resource for both uplink and downlink. The PTCCH is allocated on frames 12, 64, 116, 168, 220, 272, 324 and 376 for both uplink and downlink. The PSACCH is allocated in frames 38, 90, 142, 194, 246, 298, 350 and 402 for both uplink and downlink.

In the illustrated examples, the resulting transmission resources of the PTCCH is reduced to half compared with before the introduction of PSACCH and the PSACCH capacity is half of what it is in the circuit switched GSM case described above. Even though not illustrated here, it is of course possible to select the distribution of the PSACCH and the PTCCH differently. For example, the PSACCH may transmit in 12 of 16 frames and only allow one PTCCH downlink block (4 frames) and 4 timing advance sessions in the 416-multiframe period. Alternatively, it may be possible to allocate PSACCH in 4 of 16 frames and allow 3 PTCCH downlink blocks (12 frames) and 12 timing advance sessions in the 416-multiframe period.

The ratio between resources allocated for PTCCH and resources allocated for PSACCH may be selected based on, e.g., network configuration and user applications.

In yet another alternative embodiment of the present invention, it is possible to allocate PSACCH on the idle frames (25, 51, 77 etc.), either in addition to, in combination with, or as an alternative to the earlier described allocation of PSACCH, i.e., on the same transmission resources as the PTCCH.

The suggested channel combination (PTCCH+PSACCH) on the indicated transmission resources can support a delay sensitive application (or a real-time user) in a GPRS/EGPRS system with a side stream of control signaling without interfering with the information flow. Still, it also supports possible non-delay sensitive applications (or non real-time users) with the previously defined timing advance sessions as described above. The PSACCH may be used for measurement reports in the uplink and system information in the downlink.

Figure 7:
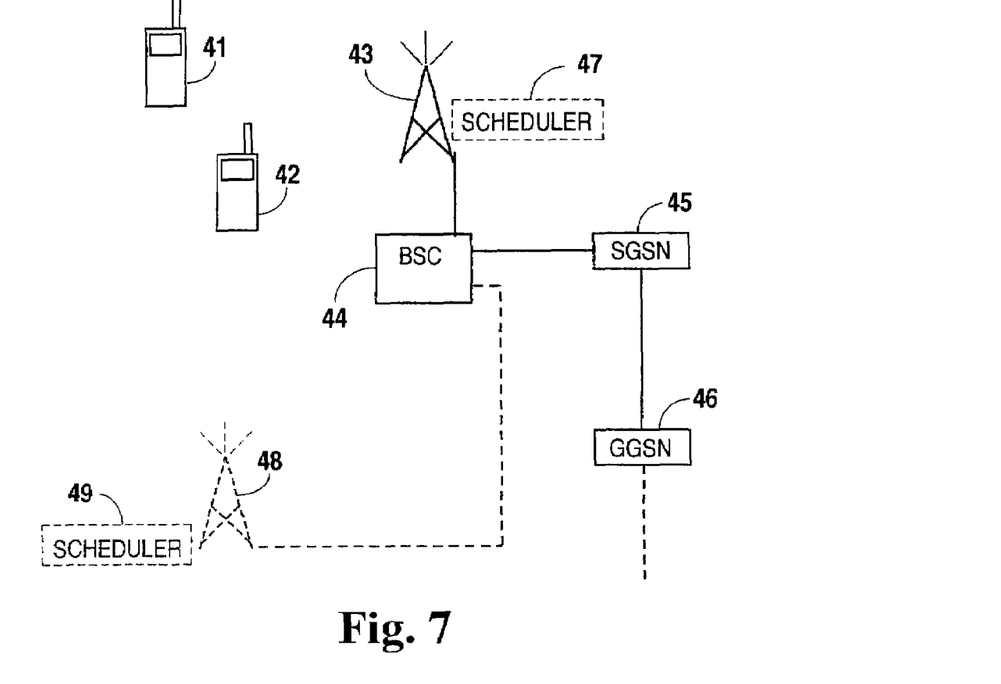
FIG. 7 illustrates a GPRS/EGPRS cellular communication system according to the invention.

FIG. 7 illustrates a number of system nodes in an exemplary GPRS/EGPRS packet data communication system in which the present invention may be implemented. In other exemplary systems, additional nodes may occur, or some node may be absent. In FIG. 7, a real-time user MS (41) may communicate with a serving base station, BS (43). The serving base station (43) is the base station communicating PSACCH information with a real-time user and PTCCH information with a non real-time user MS (42). Of course, more base stations and MSs are usually present in packet data systems, than what is illustrated in FIG. 7.

The serving base station may be connected to a Base Station Control node, BSC (44), which in turn is connected to a Serving GPRS Support Node, SGSN (45), serving one or several BSCs. The SGSN is typically the node controlling the packet flow to and from the different base stations, via the BSCs. Another GPRS support node is a Gateway GPRS Support Node GGSN (46) connected to, e.g., the internet and/or any other external networks (not shown). In FIG. 7, a scheduler (47) is connected to the serving base station (43). It is exemplary located in the base station (43), but could alternatively be located in other network nodes as well, e.g., BSC or SGSN. Scheduling functionality may also be split between different nodes, however, for simplicity it is located in one node in FIG. 7. The scheduler (47) will control the allocation of logical channels, like PSACCH and PTCCH, onto physical channels, i.e., timeslots. It may also control the allocation of real-time users onto timeslots as well as allocation of non real-time users onto timeslots. In FIG. 7 is also illustrated a second base station, (48) connected to a BSC (in this case the same as the serving base station). The second base station (48) also includes a scheduler (49) having the same functionality as the scheduler (47) of the serving base station (43).

A real-time user MS (41) may be required to make signal measurements on a neighbouring base station, e.g., BS (48) and report to the serving base station in order to support a handover decision. The measurements are reported on the allocated uplink PSACCH to the serving base station. System related information from the network to the real-time user MS (41) may be sent on the allocated downlink PSACCH.

Additionally, a non real-time user MS (42) may make continuous packet timing advance sessions with the serving base station (43). This communication occurs on the PTCCH, which shares radio channel resources with the PSACCH.

Although the different embodiments of the present invention have been described with examples from a packet switched communication system compliant to the GPRS/GSM specifications, it should be understood that the invention is applicable to any other packet switched data communication system having the same or similar structure and functionality. The described embodiments should therefore be considered exemplary rather than limiting the scope of the invention. The invention is defined by the following claims:

The invention claimed is:

1. A method in a packet data communication system for allocating user dedicated control channels on an available radio channel resource for transmission of control signals, wherein a first delay sensitive user application and at least a second user application, which is less delay sensitive than the first user application, are assigned for user data transmissions on a packet data traffic channel, the method comprising the steps of:

allocating a first logical control channel associated with the first user application on a first part of the available radio channel resource according to a first predetermined repetition pattern within a superframe structure; and allocating a second logical control channel associated with the at least second user application on a second part of the available radio channel resource according to a second predetermined repetition pattern within said superframe structure;

wherein said first and second predetermined repetition patterns are selected such that said first and second logical control channels and packet data traffic channel are allocated on a same timeslot within said superframe structure.

2. The method of claim 1, wherein each of said first and second logical control channel is allocated on the same timeslot in one frame at a time.

3. The method of claim 2, wherein each of said first and second logical control channel is allocated on the same timeslot in every second frame of said one frame at a time.

4. The method of claim 2, wherein each of said first and second logical control channel is allocated on the same timeslot in four consecutive frames of said one frame at a time.

5. A packet data communication system comprising:
a plurality of base stations for radio communication with mobile stations of user data over packet data traffic channels;
a radio transmission control node for controlling operation of said plurality of base stations; and
a scheduler associated with each of the plurality of base stations, wherein the scheduler operates to:
allocate a first logical control channel associated with a first user application on a first part of an available radio channel resource according to a first predetermined repetition pattern within a superframe structure; and
allocate a second logical control channel associated with at least a second user application on a second part of the available radio channel resource according to a second predetermined repetition pattern within the superframe structure;
wherein the at least second user application is less delay sensitive than the first user application and the first and second predetermined repetition patterns are selected such that the first and second logical control channels and the packet data traffic channel are allocated on a same timeslot within the superframe structure.

6. The system of claim 5, wherein said radio transmission control node is a base station control node BSC.

7. The system of claim 5, wherein a ratio between said first and second parts of said available radio channel resource is selected based on a network configuration.

8. The system of claim 5, wherein a ratio between said first and second parts of said available radio channel resource is selected based on said first and at least second user applications.

9. The system of claim 5, wherein a ratio between said first and second parts of said available radio channel resource is 50%.

10. A packet data communication system comprising:
a plurality of base stations for radio communication with mobile stations of user data over packet data traffic channels;
a radio transmission control node for controlling operation of the plurality of base stations; and
a scheduler associated with each of the plurality of base stations, wherein the scheduler operates to:
allocate a first logical control channel associated with a first user application on a first part of an available radio channel resource, wherein said first logical control channel is a packet slow associated control channel, PSACCH; and
allocate a second logical control channel associated with at least a second user application on a second part of the available radio channel resource, wherein said second logical control channel is a packet timing advance control channel, PTCCH,
wherein the at least second user application is less delay sensitive than the first user application.

11. The system of claim 10, wherein said scheduler further operates to assign said allocated PSACCH for transmission in an uplink direction of measurement reports.

12. The system of claim 10, wherein said scheduler further operates to assign said allocated PSACCH for transmission in a downlink direction of system-specific information.

13. A packet data communication system comprising:
a plurality of base stations for radio communication with mobile stations of user data over packet data traffic channels;
a radio transmission control node for controlling operation of the plurality of base stations; and
a scheduler associated with each of the plurality of base stations, wherein the scheduler operates to:
allocate a first logical control channel associated with a first user application on a first part of an available radio channel resource according to a first predetermined repetition pattern within a superframe structure; and
allocate a second logical control channel associated with at least a second user application on a second part of the available radio channel resource according to a second predetermined repetition pattern within the superframe structure,
wherein the at least second user application is less delay sensitive than the first user application, and wherein said scheduler further operates to select said first and second predetermined repetition patterns such that said first and second logical control channels and packet data traffic channel are allocated on a same timeslot within said superframe structure.

14. The system of claim 13, wherein said scheduler further operates to allocate each of said first and second logical control channel on timeslot in one frame at a time.

15. The system of claim 14, wherein said scheduler further operates to allocate each of said first and second logical control channel on timeslot in every second frame of said one frame at a time.

16. The system of claim 14, wherein said scheduler further operates to allocate each of said first and second logical control channel on timeslot in four consecutive frames of said one frame at a time.

* * * * *

UNITED STATES PATENT AND TRADEMARK OFFICE
CERTIFICATE OF CORRECTION

PATENT NO. : 7,054,285 B2  Page 1 of 1
APPLICATION NO. : 09/752859
DATED : May 30, 2006
INVENTOR(S) : Molno et al.

It is certified that error appears in the above-identified patent and that said Letters Patent is hereby corrected as shown below:

In Column 3, Line 14, delete "appplication" and insert -- application --, therefor.

In Column 3, Line 17, delete "appplication" and insert -- application. --, therefor.

In Column 10, Line 55, in Claim 14, after "on" insert -- the same --.

In Column 10, Line 58, in Claim 15, after "on" insert -- the same --.

In Column 10, Line 62, In Claim 16, after "on" insert -- the same --.

Signed and Sealed this

Eleventh Day of December, 2007

JON W. DUDAS
*Director of the United States Patent and Trademark Office*